(12) United States Patent
An et al.

(10) Patent No.: US 10,805,176 B2
(45) Date of Patent: Oct. 13, 2020

(54) SW FRAMEWORK SUPPORT METHOD FOR OPEN IPMI AND DCMI DEVELOPMENT

(71) Applicant: Korea Electronics Technology Institute, Seongnam-si (KR)

(72) Inventors: Jae Hoon An, Incheon (KR); Young Hwan Kim, Yongin-si (KR); Seung Gwon Kim, Anyang-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 96 days.

(21) Appl. No.: 16/147,945

(22) Filed: Oct. 1, 2018

(65) Prior Publication Data
US 2019/0149430 A1 May 16, 2019

(30) Foreign Application Priority Data
Nov. 16, 2017 (KR) .......................... 10-2017-0153056

(51) Int. Cl.
*G06F 17/20* (2006.01)
*H04L 12/24* (2006.01)
*G06F 8/65* (2018.01)
*G06F 3/0482* (2013.01)

(52) U.S. Cl.
CPC ............ *H04L 41/22* (2013.01); *G06F 3/0482* (2013.01); *G06F 8/65* (2013.01)

(58) Field of Classification Search
CPC ........... H04L 41/22; G06F 3/0482; G06F 8/65
See application file for complete search history.

(56) References Cited

U.S. PATENT DOCUMENTS

| 2004/0199899 | A1* | 10/2004 | Powers ................. G06F 8/71 717/120 |
| 2008/0208702 | A1* | 8/2008 | Peterman ........... G06Q 30/0621 705/26.5 |
| 2009/0172379 | A1* | 7/2009 | Rothman .............. G06F 9/4401 713/2 |
| 2011/0113425 | A1* | 5/2011 | Tuttle ..................... G06F 8/61 717/178 |
| 2012/0131467 | A1* | 5/2012 | Kemmler ................ G06F 8/38 715/734 |
| 2015/0052596 | A1* | 2/2015 | Ayanam ................ H04W 4/38 726/8 |

OTHER PUBLICATIONS

Nelson, "Deploying your SSH Authorized Key via Puppet" (Year: 2016).*

(Continued)

*Primary Examiner* — Shahid K Khan
(74) *Attorney, Agent, or Firm* — NSIP Law (57) ABSTRACT

A method for generating firmware by allowing a developer to freely select functions to be included in firmware installed on a main board of a server, and by building a firmware image is provided. The method for generating firmware includes: listing functions that are allowed to be included in firmware installed on a main board of a server; receiving selection of at least one of the listed functions from a user; and building a firmware image including the functions selected by the user.

Accordingly, since a firmware image is built by a developer freely selecting functions to be included in firmware installed on a main board of a server, firmware optimized for requirements of the developer can be generated.

16 Claims, 8 Drawing Sheets

(56) References Cited

OTHER PUBLICATIONS

Korean Office Action dated May 14, 2019 in corresponding Korean Patent Application No. 10-2017-0153056 (4 pages in English, 5 pages in Korean).
Nelson, "Deploying your SSH Authorized Key via Puppet," Apr. 2016 (15 pages in English).

* cited by examiner

FIG. 2

Pre-processing

FIG. 3

| OPEN IDE |||
|---|---|---|
| File  Edit  Source |||
| OPEN  IPMI/DCM BUILD |||
| Menu1<br><br>Menu2<br><br>Menu3<br><br>Menu4<br><br>Build | IPMI<br>☐ System Information<br>☐ Chassis Locator Control<br>☐ FRU Reading<br>☐ Sensor Reading<br>☐ Event Log View<br>☐ Alert Setting<br>☐ LDAP Settings<br>☐ Mouse Mode<br>☐ Network Settings<br>☐ Remote Session<br>☐ SMTP Settings<br>☐ SSL Settings<br>☐ User Settings<br>☐ Event Action<br>☐ Power Control<br>☐ KVM<br>☐ F/W Update<br>☐ SDR Update<br>☐ BMC Logout<br>☐ SOL Settings | DCMI<br>☐ BMC ID/Version Info<br>☐ System GUID<br>☐ Asset Tag<br>☐ Management Controller ID<br>☐ Power On<br>☐ Power Off<br>☐ Get Login IPMI SEL format<br>☐ Clear Log<br>☐ Inlet Temperature<br>☐ CPU Temperature<br>☐ Baseboard Temperature |
| | Select All | Build |

FIG. 4

| OPEN IDE |||
|---|---|---|
| File   Edit   Source |||
| OPEN IPMI/DCM BUILD |||
| Menu1<br>Menu2<br>Menu3<br>Menu4<br>Build | IPMI<br>■ System Information<br>■ Chassis Locator Control<br>■ FRU Reading<br>☐ Sensor Reading<br>☐ Event Log View<br>■ Alert Setting<br>■ LDAP Settings<br>■ Mouse Mode<br>■ Network Settings<br>■ Remote Session<br>☐ SMTP Settings<br>☐ SSL Settings<br>■ User Settings<br>☐ Event Action<br>☐ Power Control<br>■ KVM<br>■ F/W Update<br>■ SDR Update<br>☐ BMC Logout<br>☐ SOL Settings | DCMI<br>■ BMC ID/Version Info<br>■ System GUID<br>☐ Asset Tag<br>☐ Management Controller ID<br>■ Power On<br>■ Power Off<br>■ Get Login IPMI SEL format<br>☐ Clear Log<br>☐ Inlet Temperature<br>■ CPU Temperature<br>■ Baseboard Temperature |
| | Select All | Build |

FIG. 5

| OPEN IDE |||
|---|---|---|
| File  Edit  Source ||||

OPEN IPMI/DCM BUILD

| | IPMI | DCMI | ADD |
|---|---|---|---|
| Menu1<br>Menu2<br>Menu3<br>Menu4<br>Build | ■ System Information<br>■ Chassis Locator Control<br>■ FRU Reading<br>☐ Sensor Reading<br>☐ Event Log View<br>■ Alert Setting<br>■ LDAP Settings<br>■ Mouse Mode<br>■ Network Settings<br>■ Remote Session<br>☐ SMTP Settings<br>☐ SSL Settings<br>■ User Settings<br>☐ Event Action<br>☐ Power Control<br>■ KVM<br>■ F/W Update<br>■ SDR Update<br>☐ BMC Logout<br>☐ SOL Settings | ■ BMC ID/Version Info<br>■ System GUID<br>☐ Asset Tag<br>☐ Management Controller ID<br>■ Power On<br>■ Power Off<br>■ Get Login IPMI SEL format<br>☐ Clear Log<br>☐ Inlet Temperature<br>■ CPU Temperature<br>■ Baseboard Temperature | ■ ***** Information<br>■ *** Control<br>■ **** Setting<br>■ ***** Update<br>■ *** On |
| | Select All | Build ||

FIG. 6

| OPEN IDE |||
|---|---|---|
| File   Edit   Source ||||

| OPEN  IPMI/DCM BUILD ||||
|---|---|---|---|
| Menu1<br><br>Menu2<br><br>Menu3<br><br>Menu4<br><br>Build | IPMI<br>■ System Information<br>■ Chassis Locator Control<br>■ FRU Reading<br>☐ Sensor Reading<br>☐ Event Log View<br>■ Alert Setting<br>■ LDAP Settings<br>■ Mouse Mode<br>■ Network Settings<br>■ Remote Session<br>☐ SMTP Settings<br>☐ SSL Settings<br>■ User Settings<br>☐ Event Action<br>☐ Power Control<br>■ KVM<br>■ F/W Update<br>■ SDR Update<br>☐ BMC Logout<br>☐ SOL Settings | DCMI<br>■ BMC ID/Version Info<br>■ System GUID<br>☐ Asset Tag<br>☐ Management Controller ID<br>■ Power On<br>■ Power Off<br>■ Get Login IPMI SEL format<br>☐ Clear Log<br>☐ Inlet Temperature<br>■ CPU Temperature<br>■ Baseboard Temperature | ADD<br>■ ***** Information<br>■ *** Control<br>■ **** Setting<br>☐ ***** Update<br>☐ *** On |
| | Select All | Build | |

FIG. 7

```
keti@ubintu: ~/PycharmProjects/untitled
File   Edit   View   Search   Terminal   help
Setting maximal mount count to -1
Setting interval between checks to 0 seconds
/usr/bin/install –m 0644 support/misc/target-dir-warning.txt/home/keti/Workspace/20170830/
output/target/THIS_IS_NOT_YOUR_ROOT_FILESYSTEM
Make process finished!
Make file for all.bin copied...
Make images
gzip -9 rootfs.ext2
Mkimage – A arm -0 linux –T ramdisk –C gzip –d rootfs.ext2.gz uInitrd16m
Image Name:
Created: Wed Oct 11 16:45:49 2017
Image Type: ARM Linux RAMDisk Image (gzip compressed)
Data Size: 5413508 Bytes = 5286.63KB = 5.16MB
Load Address: 00000000
Entry Point: 00000000
All Image Combine – all.bin ...
#echo " 30 :  :  "
dd if=/dev/zero of=/home/keti/Workspace/20170830/output/images/all.bin bs=1M count=30
30+0 records in
30+0 records out
31457280 bytes (31 MB) copied, 0.0497785 s, 632 MB/s
dd if=/home/keti/Workspace/20170830/output/images/u-boot.bin of=home/keti/Workspace
/20170830/output/images/all.bin bs=1 seek0 conv=notrunc
310652+0 records in
310652+0 records out
310652 bytes(311 kB) copied, 0.323902 s, 959 kb/s
dd if=/home/keti/Workspace/20170830/output/images/uImage of=home/keti/Workspace/201
70830/output/images/all.bin bs=1 seek=524288 conv=notrunc
2494144+0 records in
2494144+0 records out
2494144 bytes (2.5 MB) copies, 2.47893 s, 1.0MB/s
dd if=/home/keti/Workspace/20170830/output/images/uInittrd16m of=home/keti/Workspace
/20170830/output/images/all.bin bs=1 seek=4194304 conv=notrunc
5413572+0 records in
5413572+0 records out
5413572 bytes (5.4 MB) copies, 5.43228 s, 997kB/s
All job is finished!
-rw-rw-r-- 1 keti keti 30M Oct 11 16:45 ./all.bin
-rw-rw-r-- 1 keti keti 30M Oct 11 16:45 ./all.bin True
```

SW FRAMEWORK SUPPORT METHOD FOR OPEN IPMI AND DCMI DEVELOPMENT

CROSS-REFERENCE TO RELATED APPLICATION(S) AND CLAIM OF PRIORITY

The present application claims the benefit under 35 U.S.C. § 119(a) to a Korean patent application filed in the Korean Intellectual Property Office on Nov. 16, 2017, and assigned Serial No. 10-2017-0153056, the entire disclosure of which is hereby incorporated by reference.

TECHNICAL FIELD OF THE INVENTION

The present disclosure relates generally to software-related technology, and more particularly, to a method and a system for generating firmware to be installed on a main board of an X86-based dual socket server for a data center.

BACKGROUND OF THE INVENTION

As baseboard management controller (BMC) firmware, which is installed on a main board of an X86-based server for a data center, only firmware provided by the manufacturer is allowed, and accordingly, there is no choice but to use only functions included in the firmware provided by the manufacturer.

Furthermore, if the firmware is not updated by the manufacturer, it may be impossible to perform maintenance of the main board of the server.

Accordingly, there is a demand for a method for allowing a developer to freely configure firmware by overcoming such as a limit to BMC firmware installed on a main board of an X86-based server for a data center.

SUMMARY OF THE INVENTION

To address the above-discussed deficiencies of the prior art, it is a primary aspect of the present disclosure to provide a method for generating firmware by allowing a developer to freely select functions to be included in firmware installed on a main board of a server, and by building a firmware image.

According to an embodiment of the present disclosure to achieve the above-described aspects, a method for generating firmware includes: listing functions that are allowed to be included in firmware installed on a main board of a server; receiving selection of at least one of the listed functions from a user; and building a firmware image including the functions selected by the user.

The listing may include listing functions of an open-type standard interface.

In addition, the listing may include additionally listing functions generated by the user.

The selecting may include receiving selection of at least one of the listed functions through a check box.

The method for generating firmware according the present disclosure may further include displaying a file name and a volume of the built firmware image.

The method for generating firmware according the present disclosure may further include generating and registering a key to be used to access a build support server providing the functions to be included in the firmware.

The method for generating firmware according the present disclosure may further include, when functions that are impossible or inappropriate to select together are selected together, issuing a warning.

The method for generating firmware according the present disclosure may further include automatically releasing selection of any one of the functions selected together.

The method for generating firmware according the present disclosure may recommending another function that is substituted for any one of the functions selected together.

According to another embodiment of the present disclosure, a firmware generation system includes: a user terminal configured to list functions that are allowed to be included in firmware installed on a main board of a server, to receive selection of at least one of the listed function from a user, and to build a firmware image including the functions selected by the user; and a firmware build server configured to provide the functions selected by the user to the user terminal.

According to still another embodiment of the present disclosure, a method for generating firmware includes: listing functions that are allowed to be included in firmware installed on a main board of a server; receiving selection of at least one of the listed functions from a user; requesting the functions selected by the user from a build support server; and building a firmware image including the received functions.

According to yet another embodiment of the present disclosure, a firmware generation terminal includes: a display configured to list functions that are allowed to be included in firmware installed on a main board of a server; an operator configured to receive selection of at least one of the listed functions from a user; a communication unit configured to request the functions selected by the user from a build support server; and a processor configured to build a firmware image including the received functions.

According to embodiments of the present disclosure as described above, since a firmware image is built by a developer freely selecting functions to be included in firmware installed on a main board of a server, firmware optimized for requirements of the developer can be generated.

Furthermore, according to embodiments of the present disclosure, it is possible to add functions directly developed by a developer to firmware, and thus various firmware can be freely developed.

According to embodiments of the present disclosure, information regarding a volume of a flash image is provided when firmware is successfully built, such that it can be determined in advance whether the BMC firmware is installable on a BMC ROM having a limited volume in the server.

In addition, according to various embodiments of the present disclosure, an SSH public key is registered at a firmware build support server, such that a developer can automatically access the corresponding server and thus convenience can be enhanced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 7 is a view illustrating performance of a BMC firmware image building operation;

DETAILED DESCRIPTION OF THE INVENTION

The present disclosure will be described in more detail with reference to the accompanying drawings.

Figure 1:
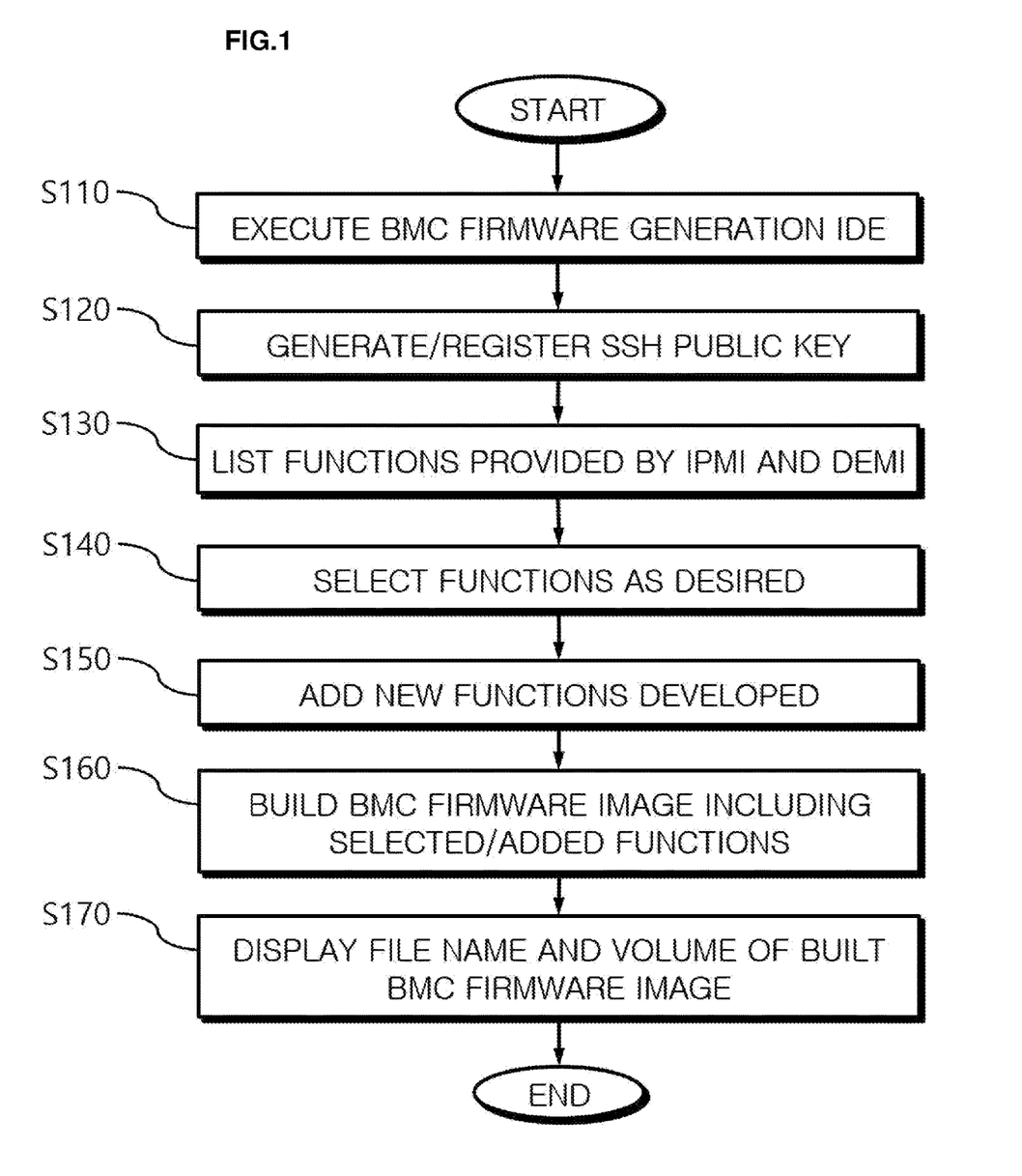
FIG. 1 is a flowchart provided to explain a firmware generation method according to an embodiment of the present disclosure.

FIG. 1 is a flowchart provided to explain a method for generating firmware according to an embodiment of the present disclosure. In an embodiment of the present disclosure, BMC firmware to be installed on a main board of an X86-based dual socket server for a data center is generated.

BMC firmware flash image building for generating BMC firmware is performed in an IDE using an SW framework, and may use functions provided by an IPMI and a DCMI which are open type standard interfaces.

Figure 2:
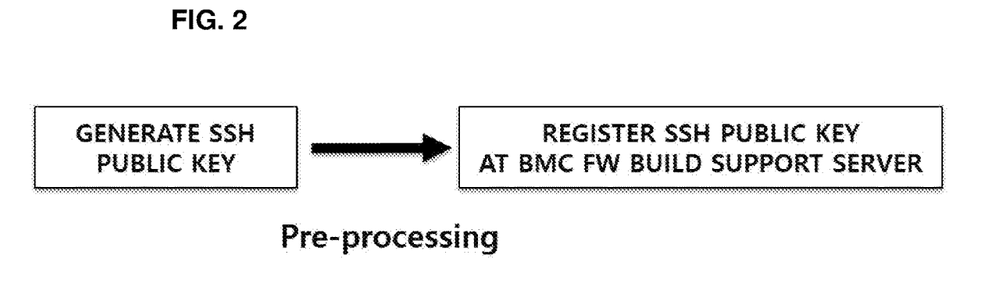
FIG. 2 is a view provided to additionally explain a process of generating/registering an SSH public key.

To achieve this, a developer executes a BMC firmware generation IDE, first, (S110), and generates and registers an SSH public key (S120). In step S120 which is a preliminary procedure for generating BMC firmware, the SSH public key is registered at a BMC firmware build server (not shown) as shown in FIG. 2.

Once the SSH public key is registered in step S120, the developer is not required to enter a user account and a password every time the developer accesses a server to build BMC firmware, and may be automatically authenticated by using an SSH keygen.

In the BMC firmware generation IDE, functions that may be included in the BMC firmware are listed and provided (S130).

Figure 3:
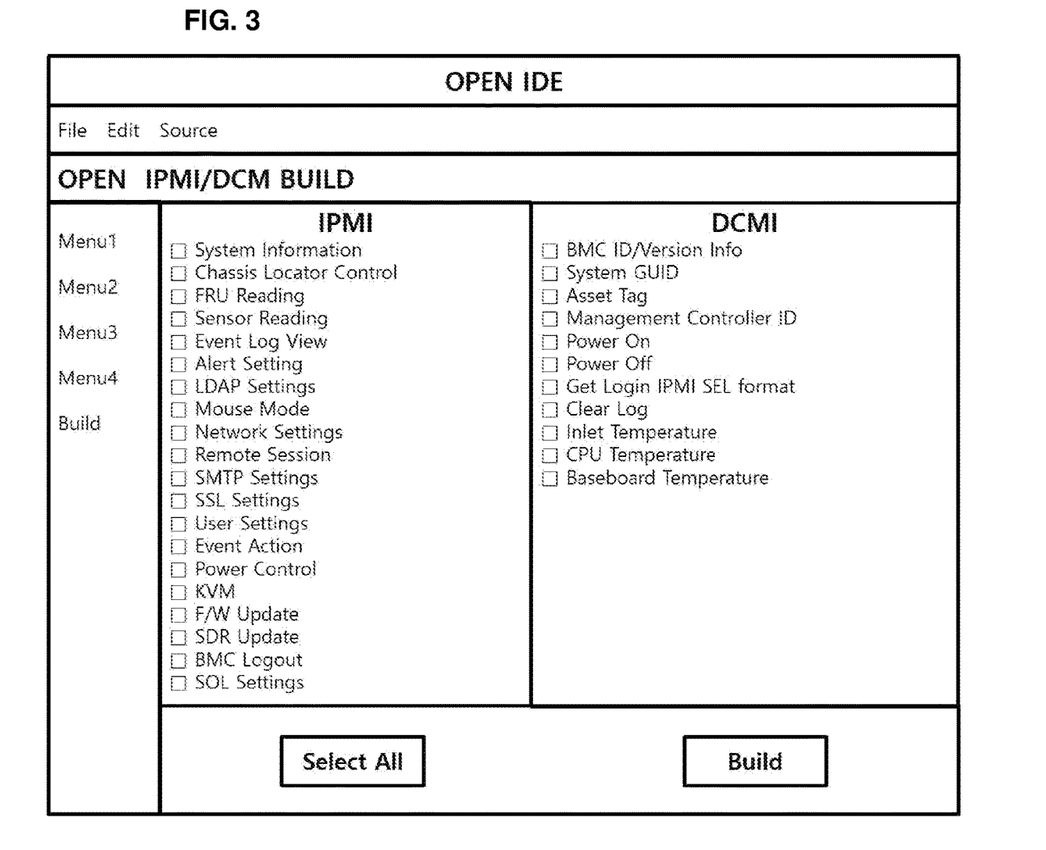
FIG. 3 is a view illustrating an integrated development environment (IDE) in which functions provided by an intelligent platform management interface (IPMI) and functions provided by a data center manageability interface (DCMI) are listed.

The functions listed in step S130 may be implemented by functions provided by open type standard interfaces, that is, functions provided by the IPMI and functions provided by the DCMI, as shown in FIG. 3.

The developer may select function as he/she desires from the functions listed in step 130 (S140).

Figure 4:
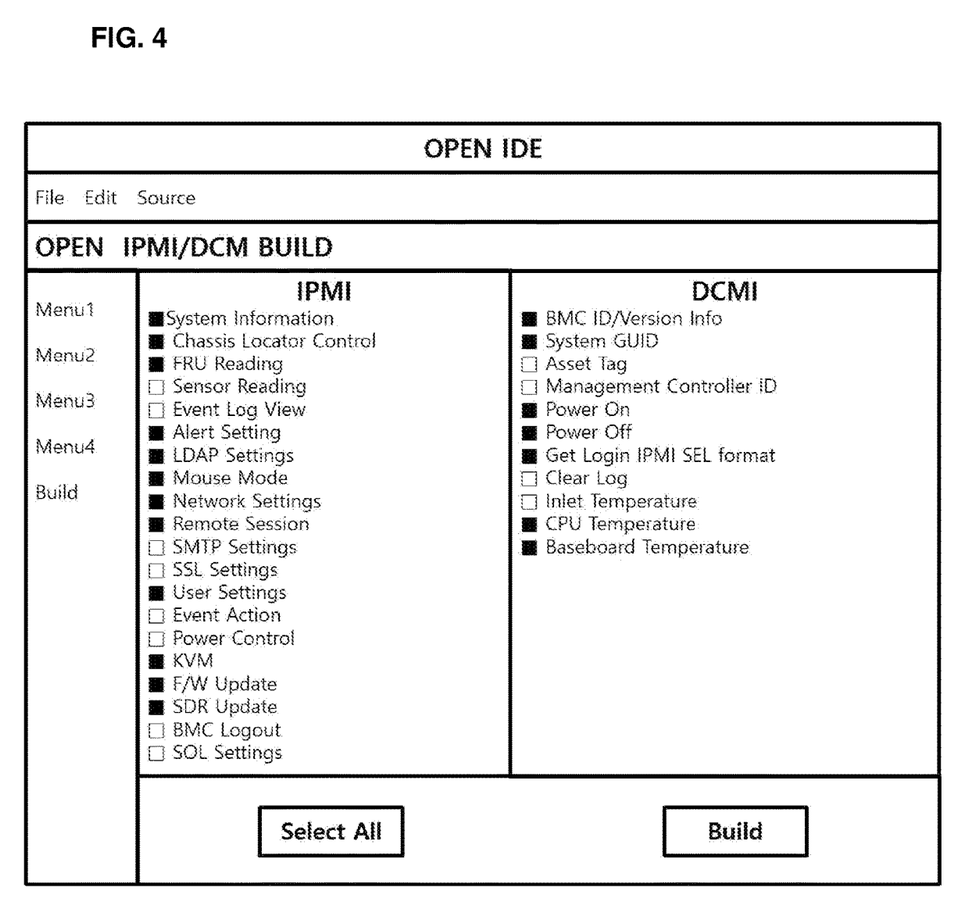
FIG. 4 is a view illustrating a situation in which some of the functions of the IPMI and the DCMI are selected by a developer.

FIG. 4 illustrates a situation in which some of the functions of the IPMI and the DCMI listed by the developer are selected. As shown in FIG. 4, the functions may be selected via check boxes.

Furthermore, the developer may add other new functions that are not listed in step S130, and accordingly, the functions added by the developer are listed in the IDE (S150). That is, it is possible to add the new functions directly developed by the developer.

Figure 5:
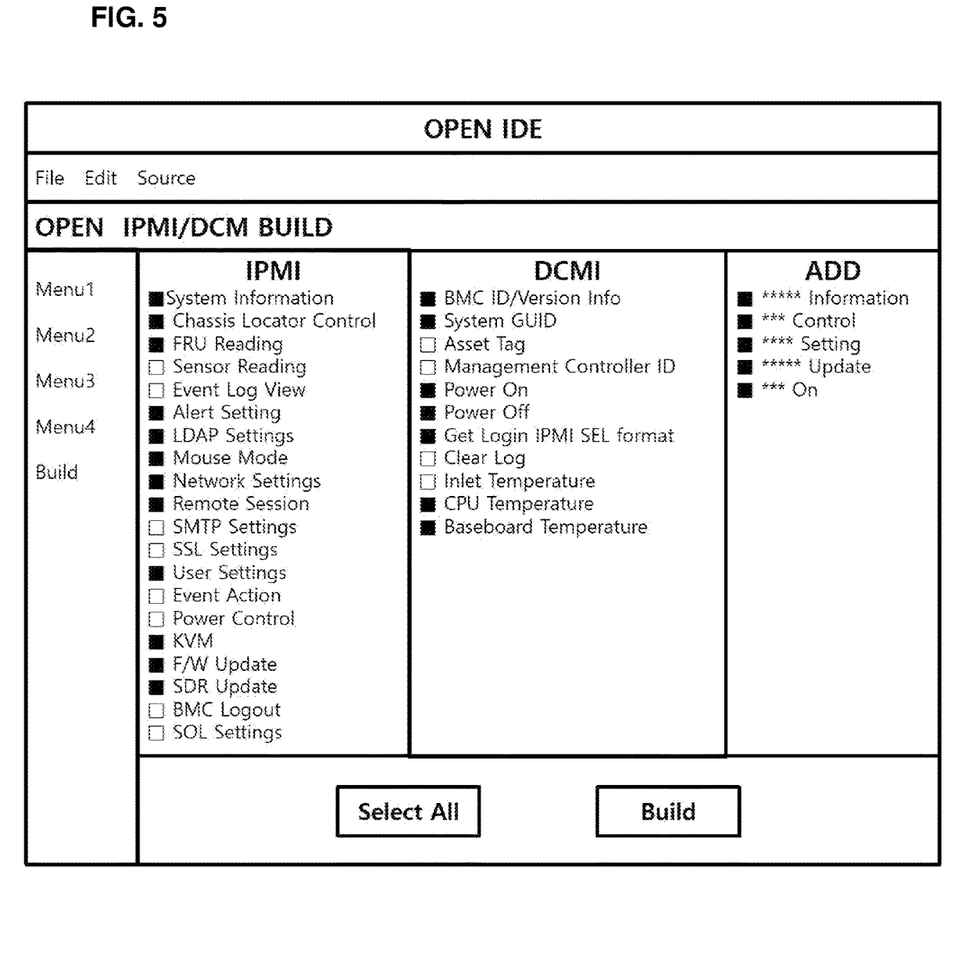
FIG. 5 is a view illustrating a situation in which new functions directly developed by the developer are added.
Figure 6:
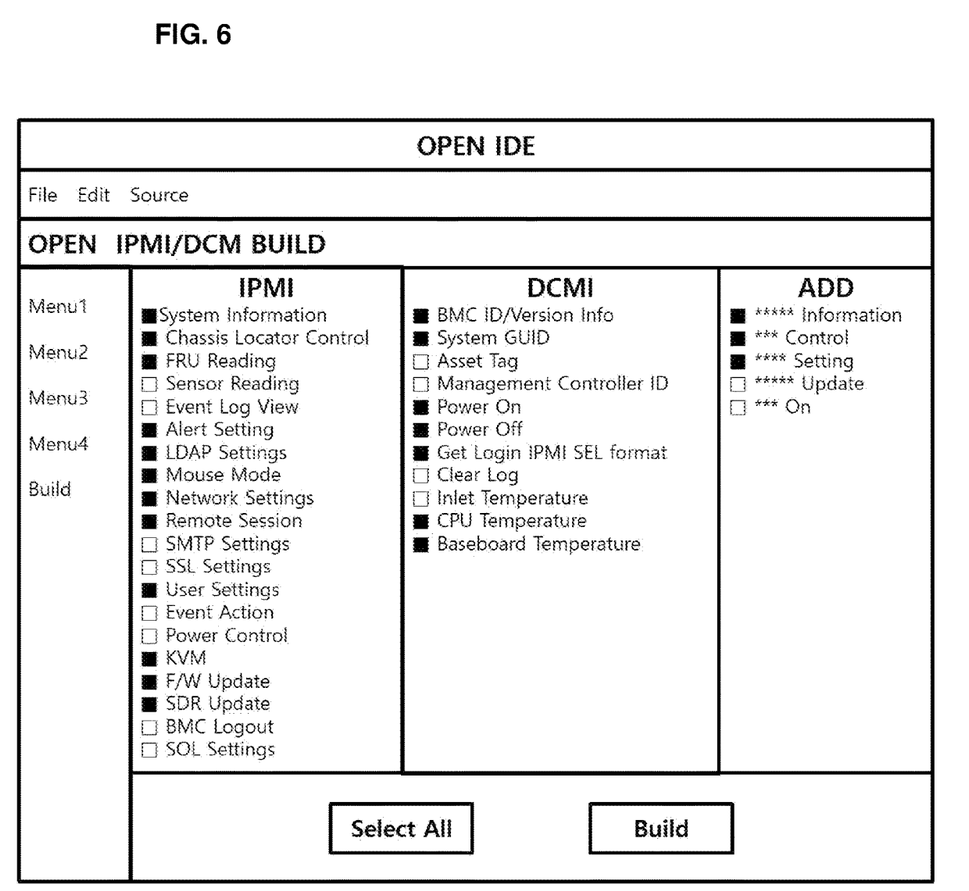
FIG. 6 is a view illustrating a situation in which some of the functions added by the developer are released from selection.

FIG. 5 illustrates a situation in which new functions directly developed by the developer are added. Furthermore, some of the functions added by the developer may be released from selection as shown in FIG. 6. Some of the added functions may be selectively released from selection by unchecking check boxes.

Next, the IDE builds a BMC firmware image including the functions selected by a user (S160). A building command may be executed by clicking a "Build" button provided on the right of the lower portion of FIG. 6 using a mouse. FIG. 7 illustrates performance of a BMC firmware image building operation.

Figure 8:
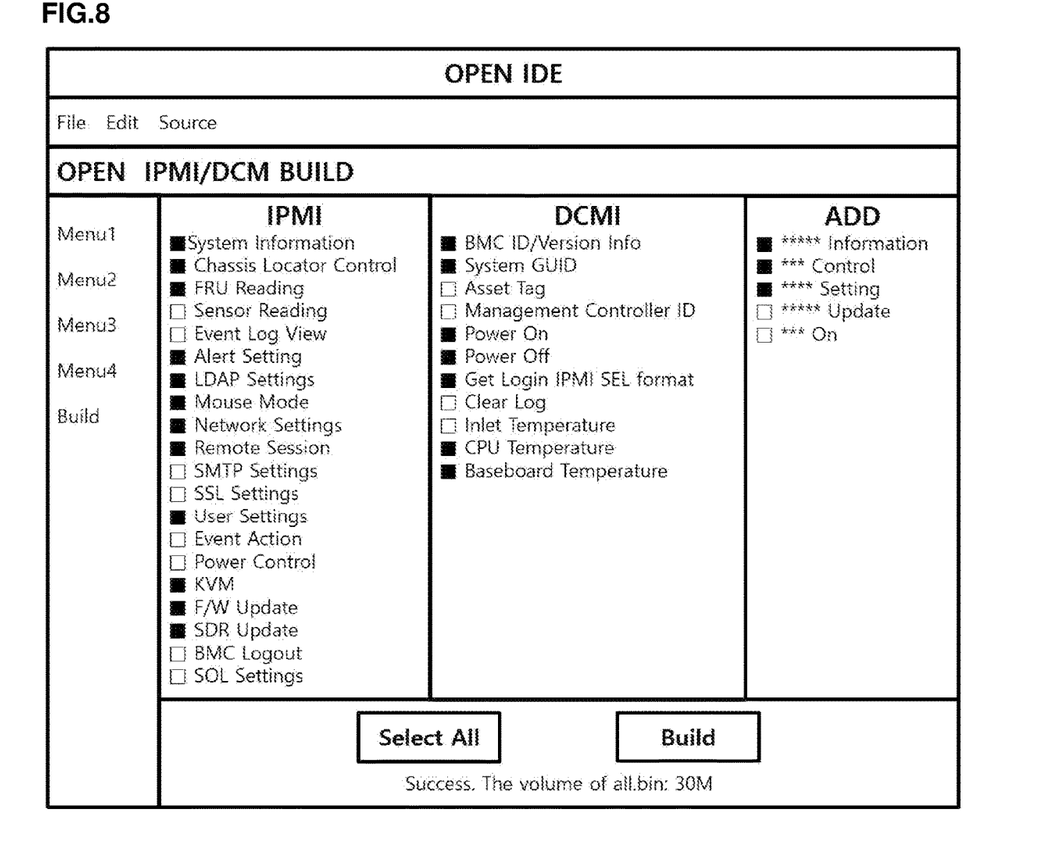
FIG. 8 is a view illustrating display of a file name and a volume after building is completed.

When the building is successfully completed, the IDE display a file name and a volume of a built BMC firmware image (S170). FIG. 8 illustrates the IDE in which the building is completed, and it can be known that the file name and the volume are displayed on the lower portion.

Through this, the developer can identify the volume of the built BMC firmware image, and can determine in advance whether the BMC firmware is installable on a BMC ROM having a limited volume in the server.

Figure 9:
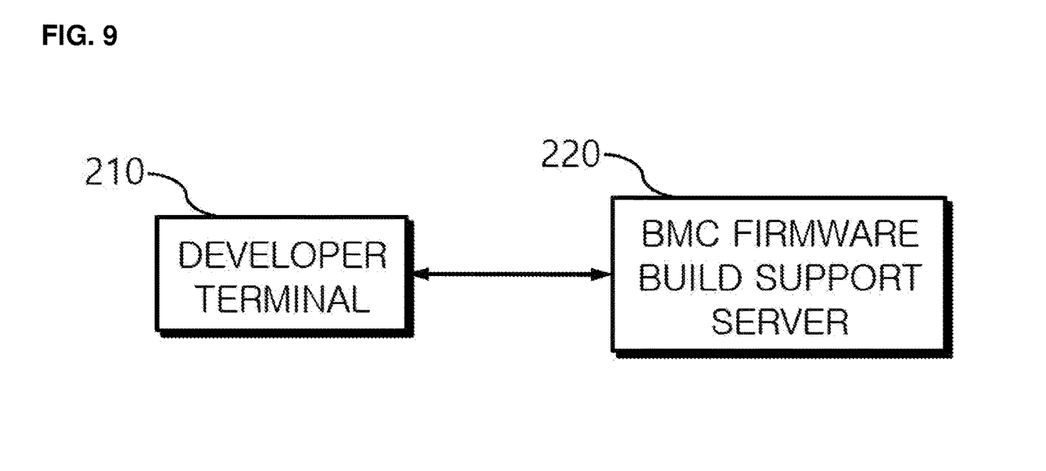
FIG. 9 is a view provided to explain a BMC firmware generation system according to another embodiment of the present disclosure.

FIG. 9 is a view provided to explain a BMC firmware generation system according to another embodiment of the present disclosure. The BMC firmware generation system according to an embodiment of the present disclosure is established by including a developer terminal 210 and a BMC firmware build support server 220 as shown in FIG. 9.

The developer terminal 210 is a developer's computing system to use a BMC firmware generation IDE. The developer terminal 210 generates/registers an SSH public key through the BMC firmware generation IDE.

In addition, the developer terminal 210 lists functions that may be included in BMC firmware, and receives selection/additions of functions from a user and builds a BMC firmware image.

The BMC firmware build server 220 provides the list of functions provided by the IPMI and the DCMI which are open type standard interfaces to the developer terminal 210, and provides functions selected by the developer to the developer terminal 210.

Figure 10:
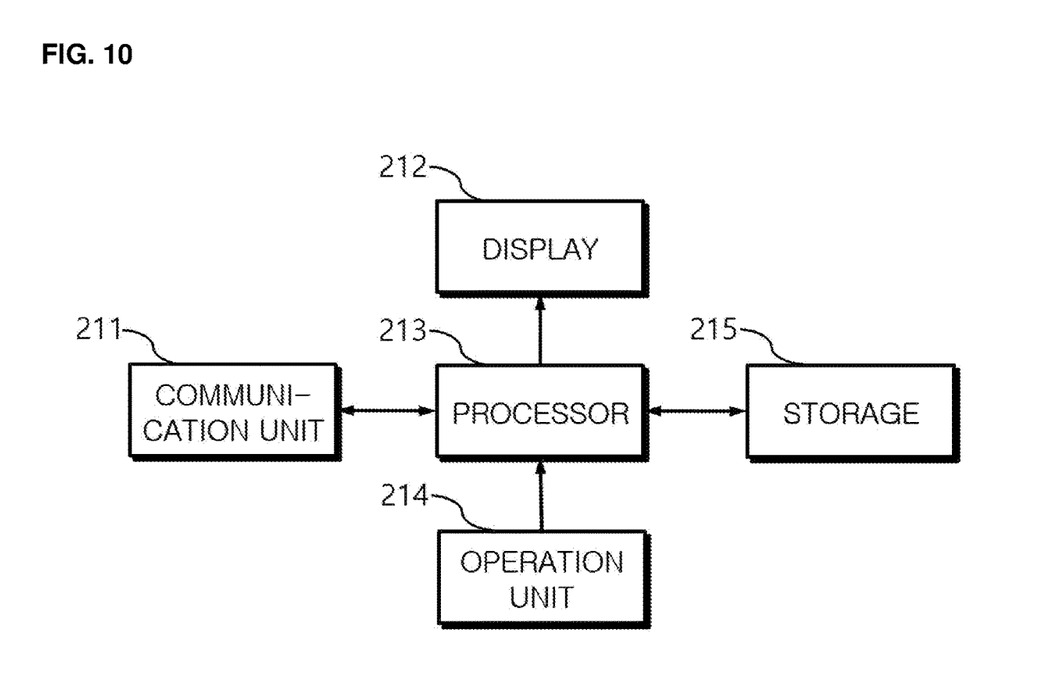
FIG. 10 is a detailed block diagram of a developer terminal illustrated in FIG. 9.

FIG. 10 is a detailed block diagram of the developer terminal 210 illustrated in FIG. 9. The developer terminal 210 includes a communication unit 211, a display 212, a processor 213, an operator 214, and a storage 215.

The communication unit 211 connects communication with the BMC firmware build server 220, and receives the list of functions provided by the IPMI and the DCMI and functions selected by the developer.

The processor 213 lists the functions that may be included in BMC firmware on the display 212, and receives selection/addition of functions from the user through the operator 214 and builds a BMC firmware image.

The storage 215 is a storage medium which provides a storage space necessary for operating the processor 213.

Up to now, the method and the system for generating BMC firmware to be installed on a main board of an X86-based dual socket server for a data center according to preferred embodiments have been described in detail.

Embodiments of the present disclosure provide the IDE based on a graphic user interface, allow a developer to select functions of the IPMI and functions of the DCMI, and to add functions directly developed by himself/herself, and generate customized firmware as the developer desires.

Furthermore, as in the above-described embodiment, the user is allowed to select/add functions in principle. However, when functions that are impossible or inappropriate to select together are selected together, a warning may be issued. To achieve this, the functions that are impossible or inappropriate to select together are listed in the form of a table, and are required to be provided/retained.

Furthermore, when the functions that are impossible or inappropriate to select together are selected together, one of the functions selected together may be automatically released from selection.

In another way, when the functions that are impossible or inappropriate to select together are selected together, another function that can be substituted for any one of the functions selected together may be recommended.

The BMC firmware installed on the main board of the X86-based dual socket server for the data center described above is merely an example. The technical concept of the present disclosure can be applied to generation of another type of firmware.

The technical concept of the present disclosure may be applied to a computer-readable recording medium which records a computer program for performing the apparatus and the method according to embodiments of the present disclosure. In addition, the technical concept according to various embodiments of the present disclosure may be implemented in the form of a computer-readable code recorded on a computer-readable recording medium. The computer-readable recording medium may be any data storage device from which data can be read by a computer and which can store data. For example, the computer-readable recording medium may be a read only memory (ROM), a random access memory (RAM), a CD-ROM, a magnetic tape, a floppy disk, an optical disk, a hard disk drive, or the like. A computer-readable code or program that is stored in the computer-readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A method for generating firmware, the method comprising:
    listing first functions that are allowed to be included in firmware installed on a main board of a server;
    listing second functions in response to the second functions being generated and added by a user;
    receiving selection of at least one of the listed first and second functions from the user; and
    building a firmware image comprising the at least one of the listed first and second functions selected by the user, wherein
    the method further includes, when functions that are impossible or inappropriate to select together are selected together, automatically releasing selection of any one of the functions selected together before building the firmware image.

2. The method of claim 1, wherein the listing of the first functions comprises listing functions of an open-type standard interface.

3. The method of claim 1, wherein the receiving the selection comprises receiving the selection of the at least one of the listed first and second functions through a check box.

4. The method of claim 1, further comprising providing a file name and a volume of the built firmware image for displaying.

5. The method of claim 1, further comprising generating and registering a key to be used to access a build support server providing the first functions to be included in the firmware.

6. The method of claim 1, further comprising recommending another function that is substituted for any one of the functions selected together.

7. A firmware generation system comprising:
    a user terminal configured to:
    list first functions that are allowed to be included in firmware installed on a server;
    listing second functions in response to the second functions being generated and added by a user;
    receive selection of at least one of the listed first and second function from the user; and
    build a firmware image comprising the at least one of the listed first and second functions selected by the user, and
    a firmware build server configured to provide the first functions selectable by the user to the user terminal,
    wherein the user terminal is further configured to, when functions that are impossible or inappropriate to select together are selected together, automatically release selection of any one of the functions selected together before building the firmware image.

8. A method for generating firmware, the method comprising:
    listing first functions that are allowed to be included in firmware installed on of a server;
    listing second functions in response to the second functions being generated and added by a user;
    receiving selection of at least one of the listed first and second functions from the user;
    requesting the at least one of the listed first and second functions selected by the user from a build support server; and
    building a firmware image comprising the received at least one of the listed first and second functions, wherein
    the method further includes, when functions that are impossible or inappropriate to select together are selected together, automatically releasing selection of any one of the functions selected together before building the firmware image.

9. The system of claim 7, wherein the second functions are functions developed by the user for the generating.

10. The system of claim 7, further comprising registering a generated key at a providing the first functions to be included in the firmware, and
  connecting and accessing to the build support server, using the registered generated key.

11. The system of claim 7, further comprising identifying a volume of the built firmware image to determine whether the built firmware is installable on the server having a limited capacity.

12. The system of claim 7, further comprising providing the built firmware image to the server to be installed, depending on a result of the identifying.

13. The method of claim 11, wherein the second functions are functions developed by the user for the generating.

14. The system method of claim 8, further comprising registering a generated key at a providing the first functions to be included in the firmware, and
  connecting and accessing to the build support server, using the registered generated key.

15. The method of claim 8, further comprising identifying a volume of the built firmware image to determine whether the built firmware image is installable on the server having a limited capacity.

16. The method of claim 8, further comprising providing the built firmware image to the server to be installed, depending on a result of the identifying.

\* \* \* \* \*